United States Patent
Chen et al.

(10) Patent No.: US 11,095,162 B1
(45) Date of Patent: Aug. 17, 2021

(54) WIRELESS POWER SYSTEM WITH POWER CONTROL

(71) Applicant: Apple Inc., Cupertino, CA (US)

(72) Inventors: Weiyun Chen, Los Gatos, CA (US); Stephen C. Terry, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/930,162

(22) Filed: Jul. 15, 2020

Related U.S. Application Data

(60) Provisional application No. 62/888,891, filed on Aug. 19, 2019.

(51) Int. Cl.
  *H02J 50/12* (2016.01)
  *H02J 50/80* (2016.01)

(52) U.S. Cl.
  CPC .............. *H02J 50/12* (2016.02); *H02J 50/80* (2016.02)

(58) Field of Classification Search
  CPC ................................. H02J 50/12; H02J 50/80
  See application file for complete search history.

(56) References Cited

U.S. PATENT DOCUMENTS

| | | |
|---|---|---|
| 9,553,473 B2 | 1/2017 | Zeine et al. |
| 9,805,863 B2 | 10/2017 | Hansen et al. |
| 10,177,604 B2 | 1/2019 | Petersen |
| 10,454,296 B2 | 10/2019 | Hwang |
| 10,530,188 B2 | 1/2020 | Baarman et al. |
| 10,658,880 B2 | 5/2020 | Kim et al. |
| 2019/0081499 A1 | 3/2019 | Sun et al. |
| 2019/0356177 A1 | 11/2019 | Swan |
| 2019/0393734 A1 | 12/2019 | Zhou et al. |
| 2019/0393928 A1 | 12/2019 | Leabman |
| 2020/0036218 A1 | 1/2020 | Maalouf et al. |

*Primary Examiner* — Robert L Deberadinis
(74) *Attorney, Agent, or Firm* — Treyz Law Group, P.C.; G. Victor Treyz; Joseph F. Guihan

(57) ABSTRACT

A wireless power system has a wireless power transmitting device and a wireless power receiving device. The wireless power transmitting device and wireless power receiving device may include control circuitry that measures operating parameters. During wireless power transmission operations, the wireless power receiving device may periodically send feedback to the wireless power transmitting device such as in-band wireless power adjustment commands requesting that the wireless power transmitting device adjust the amount of power being transmitted from the wireless power transmitting device to the wireless power receiving device. Faster estimates of desired adjustments to the amount of transmitted power can be made by the wireless power transmitting device using real-time measurements of wireless power transmitting device coil current and wireless power transmitting device coil voltage.

20 Claims, 3 Drawing Sheets

US 11,095,162 B1

WIRELESS POWER SYSTEM WITH POWER CONTROL

This application claims the benefit of provisional patent application No. 62/888,891, filed Aug. 19, 2019, which is hereby incorporated by reference herein in its entirety.

FIELD

This relates generally to power systems, and, more particularly, to wireless power systems for charging electronic devices.

BACKGROUND

In a wireless charging system, a wireless power transmitting device such as a charging mat wirelessly transmits power to a wireless power receiving device such as a portable electronic device. The portable electronic device has a coil and rectifier circuitry. The coil of the portable electronic device receives alternating-current wireless power signals from the wireless charging mat. The rectifier circuitry converts the received signals into direct-current power.

SUMMARY

A wireless power system has a wireless power transmitting device and a wireless power receiving device. The wireless power transmitting device has wireless power transmitting circuitry with one or more wireless power transmitting coils for transmitting wireless power. The wireless power receiving device has wireless power receiving circuitry for receiving the transmitted wireless power. The wireless power receiving circuitry may have a wireless power receiving coil and a rectifier. Measurement circuitry in the wireless power transmitting device and wireless power receiving device may measure coil voltages, coil currents, and other operating parameters.

During wireless power transmission operations, the wireless power receiving device may periodically send information on measured parameters and other information to the wireless power transmitting device. The wireless power receiving device may send feedback to the wireless power transmitting device such as in-band wireless power adjustment commands. These commands may be sent to request that the wireless power transmitting device adjust the amount of power being transmitted from the wireless power transmitting device to the wireless power receiving device. Estimates of desired adjustments to the amount of transmitted power can be made by the wireless power transmitting device using real-time measurements of wireless power transmitting device coil current and wireless power transmitting device coil voltage. A model of the circuit network of the wireless power transmitting system may be used in connection with making the low-latency estimates of the transmitted power. The model may, for example, be used to estimate rectifier current and/or voltage. The estimates made by the wireless power transmitting power with low latency.

DETAILED DESCRIPTION

A wireless power system includes a wireless power transmitting device such as a wireless charging mat. The wireless power transmitting device wirelessly transmits power to one or more wireless power receiving devices. The wireless power receiving devices may include devices such as a wristwatches, cellular telephones, tablet computers, laptop computers, or other electronic equipment. Each wireless power receiving device uses power from the wireless power transmitting device for powering the device and for charging an internal battery.

Wireless power is transmitted from the wireless power transmitting device to a wireless power receiving device using one or more wireless power transmitting coils. The wireless power receiving device has one or more wireless power receiving coils coupled to rectifier circuitry. The rectifier circuitry converts received wireless power signals from the wireless power receiving coils into direct-current power.

Figure 1:
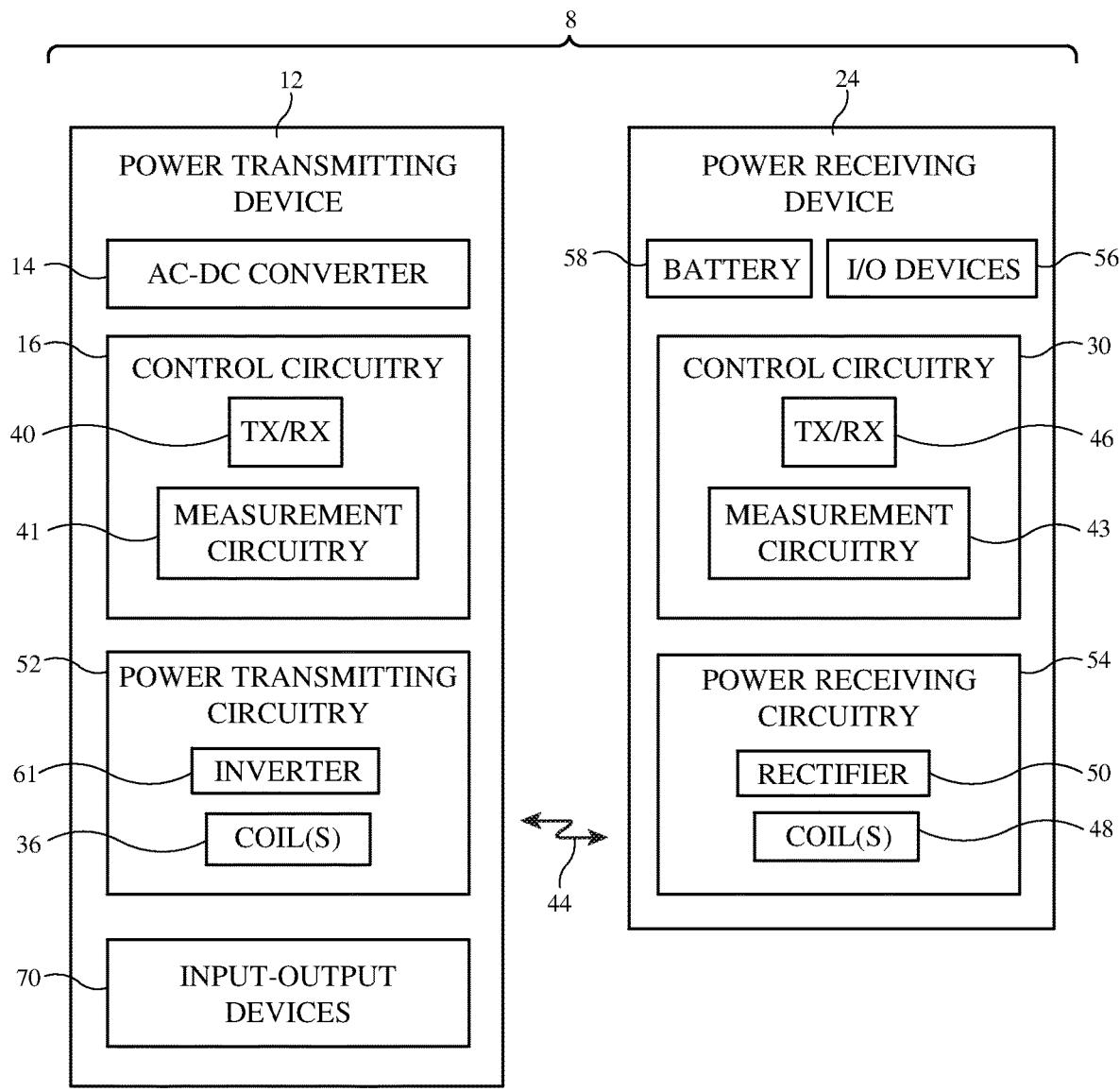
FIG. 1 is a schematic diagram of an illustrative wireless power system in accordance with an embodiment.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in selecting coils, determining power transmission levels, processing sensor data and other data to detect foreign objects, adjust power transmission and reception parameters, and perform other tasks, processing user input, handling negotiations between devices 12 and 24, sending and receiving in-band and out-of-band data, making measurements, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat or charging puck that includes power adapter circuitry), may be a wireless charging mat or puck that is coupled to a power adapter or other equipment by a cable, may be a portable device, may be equipment that has been incorporated into furniture, a vehicle, or other system, may be a removable battery case, or may be other wireless power transfer equipment.

Power receiving device 24 may be a portable electronic device such as a wristwatch, a cellular telephone, a laptop computer, a tablet computer, an accessory such as an earbud, or other electronic equipment. Power transmitting device 12 may be coupled to a wall outlet (e.g., an alternating current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 uses power transmitting circuitry 52 to transmit wireless power to power receiving circuitry 54 of device 24. Power transmitting circuitry 52 may have switching circuitry (e.g., inverter circuitry 61 formed from transistors) that is turned on and off based on control signals provided by control circuitry 16 to create AC current signals through one or more wireless power transmitting coils such as wireless power transmitting coils 36. These coil drive signals cause coil(s) 36 to transmit wireless power. Coils 36 may be arranged in a planar coil array (e.g., in configurations in which device 12 is a wireless charging mat) or may be arranged to form a cluster of coils (e.g., in configurations in which device 12 is a wireless charging puck). In some arrangements, device 12 (e.g., a charging mat, puck, portable device, etc.) may have only a single coil. In other arrangements, a wireless charging device may have multiple coils (e.g., two or more coils, 5-10 coils, at least 10 coils, 10-30 coils, fewer than 35 coils, fewer than 25 coils, or other suitable number of coils).

As the AC currents pass through one or more coils 36, alternating-current electromagnetic (e.g., magnetic) fields (wireless power signals 44) are produced that are received by one or more corresponding receiver coils such as coil(s) 48 in power receiving device 24. The amount of power being transmitted can be adjusted by adjusting the current applied to coil(s) 36 (e.g., by adjusting the direct-current voltage supplied to inverter 61). Device 24 may have a single coil 48, at least two coils 48, at least three coils 48, at least four coils 48, or other suitable number of coils 48. When the alternating-current electromagnetic fields are received by coil(s) 48, corresponding alternating-current currents are induced in coil(s) 48. Rectifier circuitry such as rectifier circuitry 50, which contains rectifying components such as synchronous rectification metal-oxide-semiconductor transistors arranged in a bridge network, converts received AC signals (received alternating-current signals associated with electromagnetic signals 44) from one or more coils 48 into DC voltage signals for powering device 24.

The DC voltage produced by rectifier circuitry 50 (sometime referred to as rectifier output voltage Vrect) can be used in charging a battery such as battery 58 and can be used in powering other components in device 24 such as input-output devices 56. Input-output devices 56 may include input devices for gathering user input and/or making environmental measurements and may include output devices for providing a user with output. As an example, input-output devices 56 may include a display for creating visual output, a speaker for presenting output as audio signals, light-emitting diode status indicator lights and other light-emitting components for emitting light that provides a user with status information and/or other information, haptic devices for generating vibrations and other haptic output, and/or other output devices. Input-output devices 56 may also include sensors for gathering input from a user and/or for making measurements of the surroundings of system 8. Illustrative sensors that may be included in input-output devices 56 include three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible cameras with respective infrared and/or visible digital image sensors and/or ultraviolet light cameras), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based (optical) proximity sensors, other proximity sensors, force sensors, sensors such as contact sensors based on switches, gas sensors, pressure sensors, moisture sensors, magnetic sensors, audio sensors (microphones), ambient light sensors, optical sensors for making spectral measurements and other measurements on target objects (e.g., by emitting light and measuring reflected light), microphones for gathering voice commands and other audio input, distance sensors, sensors that are configured to gather information on motion, position, and/or orientation (e.g., accelerometers, gyroscopes, compasses, and/or inertial measurement units that include all of these sensors or a subset of one or two of these sensors), sensors such as buttons that detect button press input, joysticks with sensors that detect joystick movement, keyboards, and/or other sensors. Device 12 may have one or more input-output devices 70 (e.g., input devices and/or output devices of the type described in connection with input-output devices 56) or input-output devices 70 may be omitted (e.g., to reduce device complexity).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12. In-band transmissions between devices 12 and 24 may be performed using coils 36 and 48. With one illustrative configuration, frequency-shift keying (FSK) is used to convey in-band data from device 12 to device 24 and amplitude-shift keying (ASK) is used to convey in-band data from device 24 to device 12. Power may be conveyed wirelessly from device 12 to device 24 during these FSK and ASK transmissions.

It is desirable for power transmitting device 12 and power receiving device 24 to be able to communicate information such as received power, states of charge, operating parameter measurements, and so forth, to control wireless power transfer. However, the above-described technology need not involve the transmission of personally identifiable information in order to function. Out of an abundance of caution, it is noted that to the extent that any implementation of this charging technology involves the use of personally identifiable information, implementers should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Control circuitry 16 has measurement circuitry 41. Measurement circuitry 41 may be used to detect external objects on the charging surface of the housing of device 12 (e.g., on the top of a charging mat or, if desired, to detect objects adjacent to the coupling surface of a charging puck). Measurement circuitry 41 may also be used to measure currents and voltages in device 12 (e.g., current flowing through coil(s) 36, voltages associated with coil(s) 36, inverter voltages and currents associated with inverter 61, and other operating parameters such as coil inductance and/or Q-factor values, etc.).

The housing of device 12 may have polymer walls, walls of other dielectric, metal structures, fabric, and/or other housing wall structures that enclose coils 36 and other circuitry of device 10. The charging surface may be a planer outer surface of the upper housing wall of device 12. Circuitry 41 can detect foreign objects such as coils, paper clips, and other metallic objects and can detect the presence of wireless power receiving devices 24 (e.g., circuitry 41 can detect the presence of one or more coils 48). During object detection and characterization operations, external object measurement circuitry 41 can be used to make measurements on coils 36 to determine whether any devices 24 are present on device 12.

In an illustrative arrangement, measurement circuitry 41 of control circuitry 16 contains voltage sensors, current sensors, signal generator circuitry (e.g., oscillator circuitry for generating AC probe signals at one or more probe frequencies, a pulse generator that can create impulses so that impulse responses can be measured to gather inductance information from the frequency of ringing signals created in response to the impulses, Q-factor information from the decay envelope of the ringing signals, etc.) and signal detection circuitry (e.g., filters, analog-to-digital converters, impulse response measurement circuits, etc.). In some configurations, Q-factor measurements, inductance measurement, and other measurements may be made (e.g., before wireless power transmission operations have commenced, during wireless power transmission, during pauses between power transmission periods, and/or at other suitable times). Switching circuitry in device 12 may be used to switch desired coils into use during measurements on coils 36, during wireless power transmission, etc.

Measurement circuitry 43 in control circuitry 30 may include voltage sensors, current sensors, signal generator circuitry, pulse generator circuitry, signal detection circuitry, and other and/or measurement circuitry (e.g., circuitry of the type described in connection with circuitry 41 in control circuitry 16).

To evaluate the operation of system 8 in real time, circuitry 41 and/or circuitry 43 may be used in making current and voltage measurements associated with wireless power transmission and reception. Circuitry 41 and/or circuitry 43 may, if desired, make measurements of transmitted and received power for power transmission efficiency estimates, coil Q-factor measurements, coil inductance measurements, coupling coefficient measurements, and/or other measurements. Based on this information or other information, control circuitry 30 can characterize the operation of devices 12 and 24. For example, measurement circuitry 41 can measure coil(s) 36 to determine the inductance(s) and Q-factor value(s) for coil(s) 36, can measure transmitted power in device 12 (e.g., by measuring the direct-current voltage powering inverter 61 and direct-current current of inverter 61 and/or by otherwise measuring voltages and currents in the wireless power transmitting circuitry of device 12), and can make other measurements on operating parameters associated with wireless power circuitry and other components in device 12. In device 24, measurement circuitry 43 can measure coil(s) 48 to determine the inductance(s) and Q-factor value(s) for those coil(s), can measure received power in device 24 (e.g., by measuring the output current and output voltage Vrect of rectifier 60 and/or by otherwise measuring voltages and currents in the wireless power receiving circuitry of device 24), and can make other measurements on the operating parameters associated with wireless power circuitry and other components in device 24.

During operation of system 8, control circuitry 30 of device 24 may use measurement circuitry 43 to measure voltages and currents in device 24 such as the voltage at the output of rectifier 50 (Vrect), the battery voltage of battery 58, load current (e.g., the current supplied by rectifier 50), etc. Based on measurements such as these, control circuitry 30 can determine whether to request a change in the power being supplied wirelessly to device 24 by device 12.

If, as an example, a display or other load circuitry in device 24 (see, e.g., input-output devices 56) is turned on, this load may draw a significant amount of current. Tuning off the display or other load circuitry may abruptly stop this draw of current. As a result, there is a risk of undesired transients in the output of rectifier 60 during operation of device 10 (e.g., undesired increase or decreases in the output current and output voltage Vrect from rectifier 60).

As parameters such as rectifier current and/or voltage change, control circuitry 30 can detect these changes. Control circuitry 30 may, for example, monitor rectifier output voltage Vrect for undesired fluctuations and respond accordingly. For example, to maintain Vrect at a desired level, control circuitry 30 can provide device 12 with feedback by transmitting a wireless power adjustment command or other suitable information to device 12 (e.g., an in-band power adjustment command may be transmitted using an in-band communications link between devices 12 and 24). Control circuitry 16 in device 12 can monitor incoming in-band communications for power adjustment commands. When a command is received, control circuitry 16 can adjust the power supplied by device 12 accordingly. For example, in response to receipt of a power adjustment command requesting an increase in power, control circuitry 16 can adjust inverter 61 so that an increased amount of power is transmitted by coil 36 to coil 48.

By using control circuitry 30 to monitor for desired power transmission changes and by using in-band communications to provide corresponding feedback to control circuitry 16, system 8 can maintain operating parameters such as the rectifier output voltage at a suitable operating level even if the load conditions and/or other operating conditions of device 24 and/or system 8 change.

In-band communications using an in-band link in system 8 (e.g., ASK communications in which transceiver circuitry 46 modulates the impedance of coil 48) may, however, incur latency (e.g., about 100 ms of latency in some environments). This may tend to restrict the responsiveness of system 8 to sudden load transients.

To enhance responsiveness, control circuitry 16 may use local measurements of operating parameters in device 12 to estimate the behavior of the circuitry in device 24. Estimates may be made relatively rapidly and with low latency, thereby enhancing the responsiveness of system 8.

In particular, control circuitry 16 may use measurement circuitry 41 to gather information on the current through and voltage across coil(s) 36 and can combine these measurements with other operating parameter information (e.g., operating parameter information gathered earlier by circuitry 41 on the operating parameters of device 12 and operating parameter information gathered earlier by circuitry 43 on the operating parameters of device 24 and transmitted to device 12 using in-band communications).

With this approach, control circuitry 16 may make rapid estimates of the operating state of device 24 (e.g., a rapid estimation of rectifier current Is and/or voltage Vrect, which is sometimes referred to as Vs). With rapid estimates of values such as these available, control circuitry 16 can make corresponding timely adjustments to the amount of wireless power being transmitted from device 12 to device 24, thereby avoiding undesired energy flow to Vrect. The signal estimation process performed by device 12 may be accurate within 20%, 10%, 5%, or other suitable accuracy levels.

Even if the rapid estimates made by device 12 are not as accurate as the local measurements of Is and/or Vs (Vrect) made by circuitry 43 in device 24, the ability to perform signal estimation operations at control circuitry 16 without awaiting in-band information from device 24 allows control circuitry 16 to make rapid power adjustments to avoid undesired Vrect voltage swings. This enhances the responsiveness of system 8.

In parallel with making local estimates of parameters such as Is and/or Vs, control circuitry 12 can await in-band feedback from device 24. When a power adjustment command is received from device 24, the command may be processed to ensure that the transmitted power level is as close to the desired level as possible. It is not, however, generally necessary for control circuitry 16 to wait until such a transmitted power adjustment command is received before making wireless power transmission adjustments, because control circuitry 16 can use the local estimates to make advance predictions of necessary wireless power transmission adjustments.

Figures 2, 3, 4:
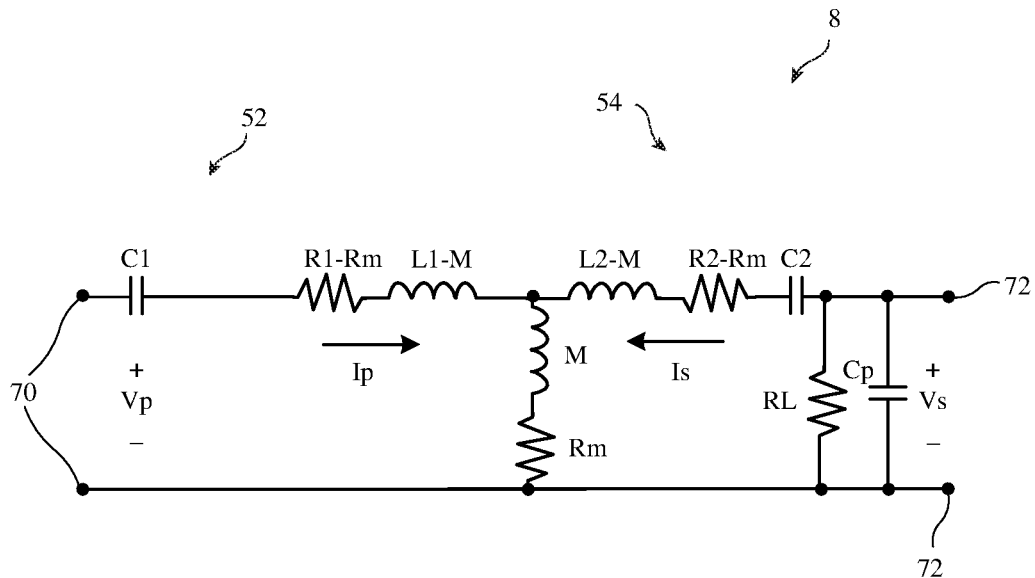
FIG. 2 is a network model of wireless power transmitting and wireless power receiving circuitry during wireless power transmission operations in a wireless power system in accordance with an embodiment.
FIGS. 3 and 4 are equations modeling the circuit behavior of the system circuitry of FIG. 2 in accordance with an embodiment.

FIG. 2 is a two-port circuit representation of the wireless circuitry of system 8 including wireless power transmitting circuitry 52 electromagnetically coupled to wireless power receiving circuitry 54. FIGS. 3 and 4 contain equations that can be used to solve for desired unknown values of operating parameters in device 24 (e.g., rectifier output voltage Vs, also sometimes referred to as Vrect), rectifier current Is, and load resistance RL (e.g., equivalent alternating-current load resistance).

As shown in FIG. 2, the wireless power transmitting coil 36 of wireless power transmitting circuitry 52 is characterized by an inductance L1. The value of L1 may be measured by circuitry 16 by measuring the frequency of coil voltage ripples induced in coil 36 by applying impulses to coil 36 (e.g., by applying low power ping pulses to coil 36 with measurement circuitry 41).

A series capacitance C1 may be included in the wireless power transmitting circuit. The output of inverter 61 may be coupled to terminals 70 and may be characterized by a voltage Vp. Depending on the configuration used for inverter 61, Vp may be a square wave, a sine wave, or other alternating current signal at the wireless power transmission frequency used to transmit wireless power to device 24 (e.g., at least 10 kHz, at least 100 kHz, less than 1 MHz, less than 300 kHz, or other suitable frequency). The output current from inverter 61 (e.g., the current flowing between terminals 70) is current Ip. This current flows through coil 36 and is sometimes referred to as the transmitter coil current. The AC resistance of coil 36 is R1.

In wireless power receiving circuitry 54, capacitor C2 may be placed in series with coil 48. The value capacitor C2 may be supplied to device 12 in advance (e.g., C2 may be measured during manufacturing and stored in device 24 and subsequently transmitted to device 12 over an in-band link between devices 12 and 24, C2 can be obtained using a link between device 12 and a remote database, C2 can be obtained by retrieving previously stored information from storage in device 12, etc.). Information on coil C1 can likewise be obtained during manufacturing and stored in device 12 for later use.

Coil 48 may be characterized by a coil inductance L2, mutual inductance M, AC resistance R2, and mutual resistance Rm. The resistance RL of FIG. 2 represents the equivalent AC load resistance of the load circuitry in device 24. Capacitance Cp is a parallel capacitance used for creating a resonant tank in wireless power receiving circuitry 54 (e.g., a resonant tank used by compatible wireless charging mats for identifying that device 24 is a compatible device during device discovery operations). The load circuitry of device 24 (e.g., battery 58, input-output devices 56, etc.) is coupled to terminals 72 and receives rectifier output voltage Vrect (Vs) and current Is.

The value of L2 may be measured by control circuitry 30 (e.g., using low power ping pulses) and this value and other component values (e.g., the values of R2, Cp, C2 etc.) can be returned to device 12 via in-band communications and stored in device 12 and/or may be gathered from a database or other sources.

The value of mutual resistance Rm is relatively low and can be neglected in the equations of FIGS. 2 and 3 or, if desired, Rm may be estimated using measurements with measurement equipment separate from system 8 (as an example).

The equations of FIGS. 3 and 4 model the circuit behavior of the circuitry of FIG. 2 during operation of system 8. The formula of FIG. 3 is in matrix notation and contains two separate equations—a first for voltage Vp in terms of Ip and Is and a second for voltage Vs in terms of Ip and Is. A third equation that is used in describing the relationship between Vs and Rs in the circuit model of FIG. 2 is shown in FIG. 4. The values of Vp and Ip can be measured locally (in device 12) in real time by control circuitry 16 (e.g., using measurement circuitry 41). There are thus three unknowns in these equations (Vs, RL, and Is), each of which can be solved for using the first, second, and third equations so that rapid estimates of the operating parameters of device 24 can be made from the measurements in device 12.

The mutual inductance value M is equal to $k[L1*L2]^{1/2}$, where k is the coupling coefficient for electromagnetic coupling between coils 36 and 49. The value of k can initially be estimated by control circuitry 12. During subsequent operations as device 12 receives feedback from device 24, device 12 can evaluate the accuracy with which the equations of FIGS. 3 and 4 are allowing device 12 to estimate Vs, RL, and Is. Any deviations between actual and estimated values can be used in improving and updating the current value of coupling coefficient k.

Figure 5:
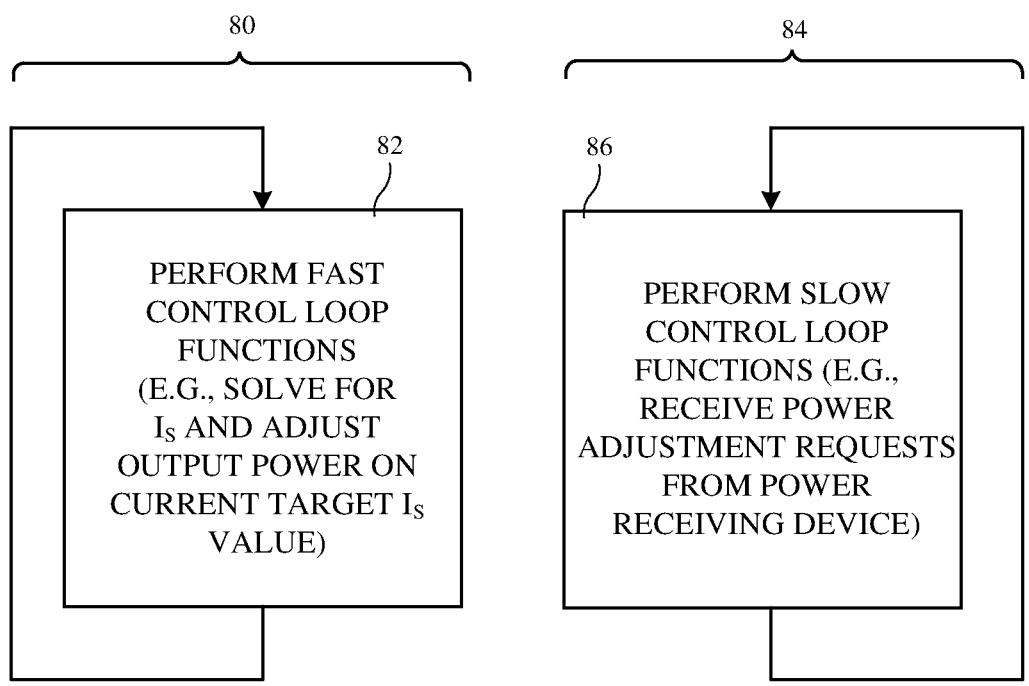
FIG. 5 is a flow chart of illustrative operations involved in using a wireless power system in accordance with an embodiment.

FIG. 5 is a flow chart of illustrative operations involved in using the circuit network model of FIG. 2 and the corresponding equations of FIGS. 3 and 4 in controlling the operation of system 8. As shown in FIG. 5, system 8 may include multiple parallel control loops such as first control loop 80 and second control loop 84.

Control loop 84 involves using control circuitry 30 in device 24 to determine whether transmitted power should be adjusted up or down and to send corresponding power adjustment commands to control circuitry 16 in device 12. Device 12 can then adjust transmitted power accordingly. Because this control loop may involve latency associated with in-band communications, control loop 84 may sometimes be referred to as forming a slower control loop.

Control loop 80 involves using the equations of FIGS. 3 and 4 to estimate parameters such as Vs, RL, and Is relatively rapidly (e.g., in less than 100 ms, less than 50 ms, less than 10 ms, or other suitable time period). This estimation process is faster (has less latency) than the latency associated with loop 84, so the corresponding response of control circuitry 16 in adjusting output power can occur more quickly than the adjustments associated with control loop 84 (e.g., at least 2 time faster, at least 3 times faster, at least 4 times faster, or more). Because loop 80 can respond more quickly than loop 84, control loop 80 may sometimes be referred to as a faster control loop.

During the operation of block 86 in loop 84, control circuitry 30 may use measurement circuitry 43 to measure operating parameters of device 24 such as Vs (Vrect), Is, RL, etc. If the measured parameters exceed predetermined threshold values or satisfy other criteria indicating that power adjustments should be made, control circuitry 30 may generate an appropriate power adjustment command. This power adjustment command may, as an example, request that device 12 increase or decrease transmitted power by a given amount. In-band communications may be used in transmitting power adjustments commands from device 24 to device 12. In response to receiving an in-band wireless power adjustment command or other information indicative of a need to adjust power, device 12 adjusts the DC power supply voltage to inverter 61 and/or makes other adjustments to wireless power transmitting circuitry 52, thereby adjusting the amount of power that is wirelessly transmitted to device 10. Because the measurements made with measurement circuitry 41 can be accurate (e.g., within an accuracy of 5%, 3%, 1%, or other suitable accuracy value), the operations of control loop 84 tend to ensure that power levels are set accurately.

Fast transients may occur due to rapid changes in the load in device 24. To prevent undesired voltage conditions (e.g., overvoltage conditions that could damage circuitry in device 24), control loop 80 makes rapid real-time estimates of the operating parameters of device 24 based on information available in device 12 such as measured values of current Ip and voltage Vp. In the event that a rapid fluctuation is detected, device 12 can take immediate remedial action (e.g., the wireless power being transmitted can be halted or lowered), without waiting for device 24 to send an in-band command to lower the transmitted power.

During the operations of block 82 of loop 80, for example, equations of FIGS. 3 and 4 may be used in estimating the value of Is and/or other operating parameters associated with operation of device 24. If a transient spike is detected using estimates of Is or other parameters from the network model of system 8 (e.g., the circuit model of FIG. 2 and the corresponding equations of FIGS. 3 and 4), the fast control loop can immediately adjust the wirelessly transmitted power from circuitry 52 without waiting for feedback from loop 84.

Accordingly, the control operations of multiple control loops such as loops 80 and 84 of FIG. 4 may be performed simultaneously in system 8 to help achieve both rapid transient responses and long term accuracy in controlling power delivery.

The foregoing is merely illustrative and various modifications can be made to the described embodiments. The foregoing embodiments may be implemented individually or in any combination.

What is claimed is:

1. A wireless power transmitting device configured to transmit wireless power to a wireless power receiving device, comprising:
   wireless power transmitting circuitry configured to transmit an amount of the wireless power to the wireless power receiving device; and
   control circuitry configured to:
   gather measurements of wireless power transmitting device operating parameters in the wireless power transmitting circuitry;
   estimate in real time a wireless power receiving device operating parameter of the wireless power receiving device using the gathered measurements; and
   adjust the amount of wireless power being transmitted using the estimate.

2. The wireless power transmitting device of claim 1 wherein the wireless power receiving device comprises wireless power receiving circuitry with a coil and a rectifier coupled to the coil and wherein the wireless power receiving device operating parameter comprises a rectifier current associated with the rectifier.

3. The wireless power transmitting device of claim 2 wherein the control circuitry is configured to estimate the rectifier current in real time based at least partly on an inductance value for the coil.

4. The wireless power transmitting device of claim 3 wherein the control circuitry is configured to receive the inductance value from the wireless power receiving device over an in-band communications link between the wireless power receiving device and the wireless power transmitting device.

5. The wireless power transmitting device of claim 4 wherein the control circuitry is configured to estimate the rectifier current in real time based at least partly on a capacitance value for a capacitor coupled in series with the coil in the wireless power receiving device.

6. The wireless power transmitting device of claim 1 wherein the wireless power receiving device has a rectifier that draws a rectifier current during wireless power transfer, wherein the control circuitry is configured to estimate the rectifier current in real time based at least partly on:
   a first capacitance value for a first capacitor coupled in series with a wireless power transmitting coil in the wireless power transmitting circuitry; and
   a second capacitance value for a second capacitor coupled in series with a wireless power receiving coil coupled to the rectifier.

7. The wireless power transmitting device of claim 1 wherein the control circuitry is configured to adjust the amount of wireless power by adjusting an inverter in the wireless power transmitting circuitry.

8. The wireless power transmitting device of claim 1 wherein the control circuitry is configured to adjust the amount of power based on received wireless power adjustment commands from the wireless power receiving device.

9. The wireless power transmitting device of claim 1 wherein the wireless power transmitting circuitry includes a wireless power transmitting coil, wherein the wireless power transmitting device operating parameters comprise a wireless power transmitting coil current for the wireless power transmitting coil and a wireless power transmitting coil voltage for the wireless power transmitting coil, wherein the wireless power receiving device operating parameter comprises rectifier current for a rectifier in the wireless power receiving device, and wherein the control circuitry is configured to:
estimate the rectifier current based on the wireless power transmitting coil voltage and the wireless power transmitting coil current; and
adjust the amount of power being transmitted using the estimate of the rectifier current.

10. The wireless power transmitting device of claim 1 wherein the wireless power transmitting circuitry includes a wireless power transmitting coil that draws a wireless power transmitting coil current and operates at a wireless power transmitting coil voltage, wherein when a load transient occurs in the wireless power receiving device, the load transient affects the wireless power transmitting coil current and the wireless power transmitting coil voltage, wherein the wireless power transmitting device operating parameters comprise the wireless power transmitting coil voltage and the wireless power transmitting coil current, and wherein the control circuitry is configured to monitor the wireless power receiving device operating parameter for changes due to the load transient by estimating the wireless power receiving device operating parameter based on the wireless power transmitting coil current and the wireless power transmitting coil voltage.

11. The wireless power transmitting device of claim 1 wherein the wireless power receiving device comprises wireless power receiving circuitry and wherein the wireless power receiving circuitry comprises:
a wireless power receiving device coil with a wireless power receiving device coil inductance;
a capacitor having a capacitance; and
a rectifier with a rectifier current,
wherein the wireless power receiving device operating parameter comprises the rectifier current, and
wherein the control circuitry is configured to estimate the rectifier current based on the wireless power transmitting device operating parameters and the capacitance, the inductance, and the rectifier current.

12. A wireless power transmitting device configured to transmit wireless power to a wireless power receiving device, comprising:
wireless power transmitting circuitry having an inverter coupled to a wireless power transmitting coil, wherein the wireless power transmitting circuitry is configured to transmit an amount of the wireless power to the wireless power receiving device; and
control circuitry configured to detect when a load transient has occurred in the wireless power receiving device from measurements of a wireless power transmitting coil voltage and a wireless power transmitting coil current at the wireless power transmitting coil.

13. The wireless power transmitting device of claim 12 wherein the control circuitry is configured to detect when the load transient has occurred by estimating an operating parameter in the wireless power receiving device using the wireless power transmitting coil voltage and the wireless power transmitting coil current.

14. The wireless power transmitting device of claim 13 wherein the operating parameter comprises a rectifier current of a rectifier in the wireless power receiving device.

15. The wireless power transmitting device of claim 14 wherein the control circuitry is configured to adjust the amount of wireless power being transmitted to the wireless power receiving device with the wireless power transmitting circuitry based on an inductance of the wireless power transmitting coil and an inductance of a wireless power receiving device coil in the wireless power receiving device.

16. A wireless power transmitting device configured to transmit wireless power to a wireless power receiving device, comprising:
wireless power transmitting circuitry having an inverter coupled to a wireless power transmitting coil, wherein the wireless power transmitting circuitry is configured to transmit an amount of the wireless power to the wireless power receiving device; and
control circuitry configured to:
measure a wireless power transmitting coil voltage of the wireless power transmitting coil;
measure a wireless power transmitting coil current of the wireless power transmitting coil;
estimate a current flowing in the wireless power receiving device using the measured wireless power transmitting coil voltage and the wireless power transmitting coil current; and
adjust the amount of wireless power being transmitted based on the estimation of the current.

17. The wireless power transmitting device of claim 16 wherein the wireless power receiving device comprises a wireless power receiving coil and a rectifier coupled to the wireless power receiving coil and wherein the current comprises a rectifier current flowing through the rectifier.

18. The wireless power transmitting device of claim 16 wherein the control circuitry is configured to estimate the current flowing in the wireless power receiving device based on a capacitance in the wireless power receiving device and an inductance of the wireless power transmitting coil.

19. The wireless power transmitting device of claim 16 wherein the control circuitry is configured to estimate the current flowing in the wireless power receiving device based on:
an inductance value of the wireless power transmitting coil;
an inductance value of a wireless power receiving coil in the wireless power receiving device; and
a mutual inductance between the wireless power transmitting coil and the wireless power receiving coil.

20. The wireless power transmitting device of claim 19 wherein the mutual inductance is calculated using a coupling coefficient value and wherein the control circuitry is configured to periodically update the coupling coefficient value.

* * * * *